United States Patent
deCarmo (12) 
(10) Patent No.: US 6,272,625 B1
(45) Date of Patent: *Aug. 7, 2001

(54) APPARATUS AND METHOD FOR PROCESSING EVENTS IN A DIGITAL VERSATILE DISC (DVD) SYSTEM USING SYSTEM THREADS AND SEPARATE DORMANT/AWAKE COUNTER THREADS AND CLOCK DRIVEN SEMAPHORES

(75) Inventor: Linden A. deCarmo, Plantation, FL (US)

(73) Assignee: Oak Technology, Inc., Sunnyvale, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/946,847

(22) Filed: Oct. 8, 1997

(51) Int. Cl.[7] .................................................. G06F 9/38
(52) U.S. Cl. .......................... 712/245; 712/215; 713/502; 709/107
(58) Field of Search .................................. 711/112, 107, 711/114, 165; 707/103; 395/570, 677; 709/102, 106, 107; 712/215, 245; 713/502; 369/19

(56) References Cited

U.S. PATENT DOCUMENTS

| 4,361,849 | 11/1982 | Bolger . | |
|---|---|---|---|
| 4,707,805 | 11/1987 | Narusawa et al. . | |
| 5,233,355 | 8/1993 | DiStefano et al. . | |
| 5,233,486 | 8/1993 | Albert . | |
| 5,345,588 | * 9/1994 | Greenwood et al. | 709/107 |
| 5,615,363 | * 3/1997 | Jenness | 707/103 |
| 5,640,538 | 6/1997 | Dyer et al. . | |
| 5,666,523 | * 9/1997 | D'Souza | 712/229 |
| 5,729,516 | * 3/1998 | Tozaki et al. | 369/58 |
| 5,832,275 | * 11/1998 | Olds | 395/712 |
| 6,000,018 | 12/1999 | Packer et al. . | |

* cited by examiner

*Primary Examiner*—B. James Peikari
(74) *Attorney, Agent, or Firm*—Kudirka & Jobse, LLP (57) ABSTRACT

A multi-threaded digital versatile disc system which is controlled by a system thread includes an independent counter thread for controlling the counter parameters. Only the counter thread (and not the system thread) increments and decrements the counter parameters based on an input from the system clock. Counter parameters can be attached, or associated, with the counter thread and all associated counter parameters are incremented together by the thread. The counter thread has a semaphore and a queue associated with it and the counter thread remains dormant until woken up by the semaphore. The semaphore queue receives periodic messages from the system clock via a conventional operating system mechanism and periodically increments and decrements its associated counter parameters. Other threads, originating from this system or from another system, can also communicate with the counter thread by means of the queue by directing an event message to the operating system which places the message in the queue.

24 Claims, 6 Drawing Sheets

APPARATUS AND METHOD FOR PROCESSING EVENTS IN A DIGITAL VERSATILE DISC (DVD) SYSTEM USING SYSTEM THREADS AND SEPARATE DORMANT/AWAKE COUNTER THREADS AND CLOCK DRIVEN SEMAPHORES

FIELD OF THE INVENTION

This invention relates generally to digital versatile disc systems and, more particularly, to techniques controlling counter parameters in a digital versatile disc system.

BACKGROUND OF THE INVENTION

Digital versatile discs (DVDs) are information storage devices used for storing prerecorded audio information, movies and computer software. The storage and playback mechanism used in DVDs closely resembles the mechanism used in compact discs (CDs) and DVD players and software use the same laser technology as CD players. Briefly, both DVDs and CDs store information as a pattern of pits formed in a metallic substrate. The pit patterns form digital words and can be read by shining a laser beam on the disc surface and detecting the reflected beam. However, the information storage capacity of a typical DVD is much higher than a CD. Presently available DVDs have a variety of capacities which depend on the technology used to manufacture the discs. Single-layer technologies can be either single or double-sided with capacities of 4.7 gigabytes and 9.4 gigabytes, respectively. Dual layer technologies are available which use single or double sided capacities that hold approximately 8.5 gigabytes per side. This high information storage capacity makes DVDs suitable for storing not only audio information, but also video information and large amounts of computer data as well.

DVD players have many CD player features, such as the ability to play selections in any order desired and the ability to read information from any point on the disc. However, DVDs can store information in several formats. For example, DVDs which are used to store video information, hereinafter called DVD-VIDEO discs, may use various known information compression algorithms, such as MPEG-2 for video compression/decompression. A DVD may also include high fidelity sound as well. In addition, a DVD may also store uncompressed linear pulse code modulated data streams which have sample rates between 48–90 kHertz and are sampled at 16 or 24 bits. Still other DVD versions, hereinafter called DVD-ROM discs, can store digital data for computer use, and the data may also be compressed on these discs.

Although DVD-ROM and DVD-VIDEO discs may share compression algorithms, the data format on DVD-VIDEO discs is significantly different than the data format found on DVD-ROM discs. One important difference is that the data content on DVD-ROM is platform-specific, while DVD-VIDEO discs operate with a platform independent navigation engine for playing interactive movies. This navigation engine requires that the files on the DVD_VIDEO disc be referenced in a predetermined directory structure.

In particular, each DVD-VIDEO disc contains a main directory denoted as a VIDEO_TS directory which contains two types of files distinguished with the file extensions .IFO and .VOB. During playback, these files are sorted by a DVD video player to form video "title" sets, which are groupings of all files necessary to play a particular DVD video "title", for example, a movie. Each video title set is composed of one .IFO file and one or more .VOB files.

A file with the .VOB extension contains the actual multimedia data and is called a video object set (VOBS). The location and format of the multimedia data stored in the video object set is defined by the associated .IFO file. In particular, .IFO files contain navigational data structures and a processor-independent interpreted language which specifies how the data structures are arranged.

The data structures themselves are composed of various objects called "program chain objects", "program objects", and "cell objects". Program chain objects link related program objects, or particular scenes, within a title and their data structures govern the playback of the program objects. For example, a simple title may contain only one program chain. However, complex titles may contain two or more program chains to allow random access to a variety of programs. The multiple program chain title can play programs linearly, randomly or in a "shuffle" mode.

Each program object in a program chain is composed of elements called "cell objects". These objects instruct a DVD player which portion of the multimedia data in one of the .VOB files to decode. In particular, the data structures in a cell object are defined in the .IFO file and the multimedia content is found in one of the .VOB files. Each cell object directs the DVD player to begin playback at a specific location in the .VOB file which is referred to as a video object unit or "VOBU". A VOBU is a container object that includes both multimedia data and playback program commands in an interleaved format.

Input can also be obtained directly from a user by means of controls, such as buttons, which can be displayed under playback program control onscreen along with the multimedia data. The playback program controls both the time duration that a control appears on the screen and the manner that the system responds to the selection of a control by a user. For example, user selection of a button may cause the playback program to jump to a new location on the disk and begin playback at the new location.

The specific program commands which are recognized by a DVD player are controlled by a device independent language and a set of DVD player parameters which define the current state of the DVD player. These commands can be broken into several categories including the following: Set, SetSystem, GoTo, Link, Jump and Compare.

Set commands permit primitive operations, such as compare or assignment operations, to manipulate the values of selected stored parameters. SetSystem commands are used to set the internal system parameters of the player. GoTo commands are used to skip to a specific instruction number in the instruction stream and Link and Jump commands cause program execution to jump to various locations within a title or menu on the disc. Finally, Compare commands allow value testing on either a system or user parameter.

A DVD player system includes a processor and associated memory, which may be part of the player or a separate computer, and display device. The player system is controlled by a playback program running under an operating system. Preferrably, the operating system is a multithreaded operating system such as WINDOWS NT® or OS/2®. In such a system, the playback program would typically comprise a system thread which controls many of the player functions, including decompressing and decoding the multimedia and program information on the DVD.

Among the DVD player parameters are several parameters that can be used as registers or counters. When a parameter is used as a register (in register mode), it simply stores data. When a parameter is used as a counter (in counter mode) it can be incremented and decremented under program control. For example, DVD player parameters include a single "system" counter parameter (also called a "navigation timer") and may include up to sixteen "user" counter parameters which facilitate system timing functions that control the time duration of various operations. For example, a user selectable menu might be displayed on a display device for a preselected amount of time.

Conventionally, each of the counter parameters are controlled by a single thread, such as the system thread, which increments, or decrements the counter parameters and resets the counters, as directed by program information in the data stream read from the disc. The system counter parameter is decremented at predetermined time intervals, e.g., every second, and includes logic for performing very specific functions that are used by the player to control system processes. These functions are defined in detail in a specification entitled "DVD 1.0 Specification", the disclosure of which is incorporated herein, in its entirety, by reference. As the aforementioned functions do not form part of the present invention, they will not be described further.

In contrast, the user counter parameters include no logic for performing any system functions and thus, merely maintain a count which is incremented when the system counter parameter is decremented. The data stream read from the disc includes references to selected user counter parameters, thereby utilizing the counter parameters in connection with functions defined in the program commands in the disc data stream.

As noted above, in conventional DVD players, the system thread is responsible for incrementing and decrementing each of the counter parameters. This requires that the system thread repeatedly pause execution of other system functions so that it can poll a system clock to determine if a predetermined time interval has elapsed. The polling may occur many times within the time interval, thus slowing down other system processes. In addition, certain system processes may have priority over the timing functions and may preempt the polling process, delaying a determination that the time interval has elapsed and thereby causing inaccurate system timing and other system errors.

Accordingly, it would be desirable to have a DVD system that ensures efficient utilization of the system thread while also maintaining the accuracy of the counter parameters in the DVD system.

SUMMARY OF THE INVENTION

In accordance with one aspect of the invention, a DVD system which is controlled by a system thread includes an independent counter thread for controlling the counter parameters. Only the counter thread (and not the system thread) increments and decrements the counter parameters based on an input from the system clock. Counter parameters can be attached, or associated, with the counter thread and all associated counter parameters are incremented together by the thread.

The system thread creates the counter thread when the system thread detects that at least one of the counter parameters is being utilized by the system. The counter thread has a semaphore and a queue associated with it and the counter thread remains dormant until woken up by the semaphore. The semaphore queue receives periodic messages from the system clock via a conventional operating system mechanism. Accordingly, the counter thread is woken up at periodic intervals so that it can increment and decrement its associated counter parameters. The counter thread does not need to consume processor time polling the system clock.

In accordance with one embodiment, the system thread and other threads can also communicate with the counter thread by means of the queue by directing an event message to the operating system which places the message in the queue. Among other things, the message notifies the counter thread which one of several selected events was detected by one of the other threads. In response, the counter thread executes a selected function on the associated counter parameters. For example, the counter thread may reset each of the associated counter parameters. Alternatively, the selected function may add or remove counter parameters from the associated counter parameter group.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF ILLUSTRATIVE EMBODIMENTS

Figure 1:
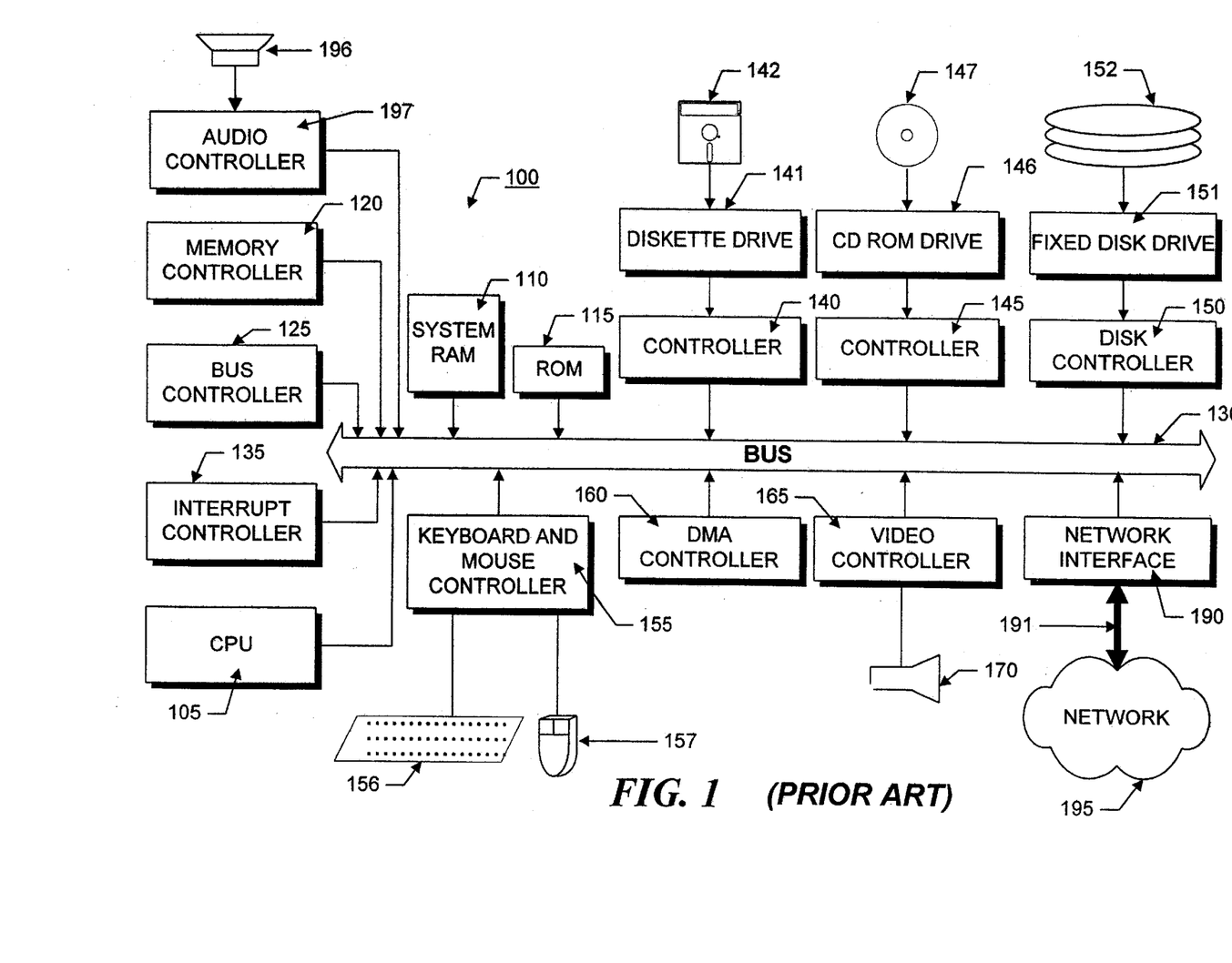
FIG. 1 is a schematic illustration of a computer system that may be utilized with a digital versatile disc system.

FIG. 1 illustrates the system architecture for an exemplary computer system 100, such as an IBM THINKPAD 701® computer, which can be utilized in connection with a DVD player system. The exemplary computer system of FIG. 1 is discussed only for descriptive purposes, however, and should not be considered a limitation of the invention. Although the description below may refer to terms commonly used in describing particular computer systems, such as an IBM THINKPAD 701® computer, the described concepts apply equally to other computer systems, including systems having architectures that are dissimilar to that shown in FIG. 1.

The computer 100 includes a central processing unit (CPU) 105, which may include a conventional microprocessor, random access memory (RAM) 110 for temporary storage of information, and read only memory (ROM) 115 for permanent information storage. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with computer 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to the computer 100 may be provided by a number of devices. For example, a keyboard 156 and a mouse 157 may be connected to bus 130 by keyboard and mouse controller 155. An audio transducer 196, which may act as both a microphone and a speaker, is connected to bus 130 by audio controller 197. It should be obvious to those reasonably skilled in the art that other input devices, such as a pen and/or tablet and a microphone for voice input, may be connected to computer 100 through bus 130 and an appropriate controller. DMA controller 160 is provided for performing direct memory access to system RAM 110. A visual display is generated by a video controller 165, which controls video display 170.

Computer system 100 generally is controlled and coordinated by operating system software, such as the WINDOWS 95® operating system (available from Microsoft Corp., Redmond, Wash.). Among other computer system control functions, the operating system controls allocation of system resources and performs tasks such as process scheduling, memory management, networking and I/O services.

Computer 100 also includes a network adapter 190 that allows the computer 100 to be interconnected to a network 195 via a bus 191. The network 195 may be a local area network (LAN), a wide area network (WAN), or the Internet.

Figure 2:
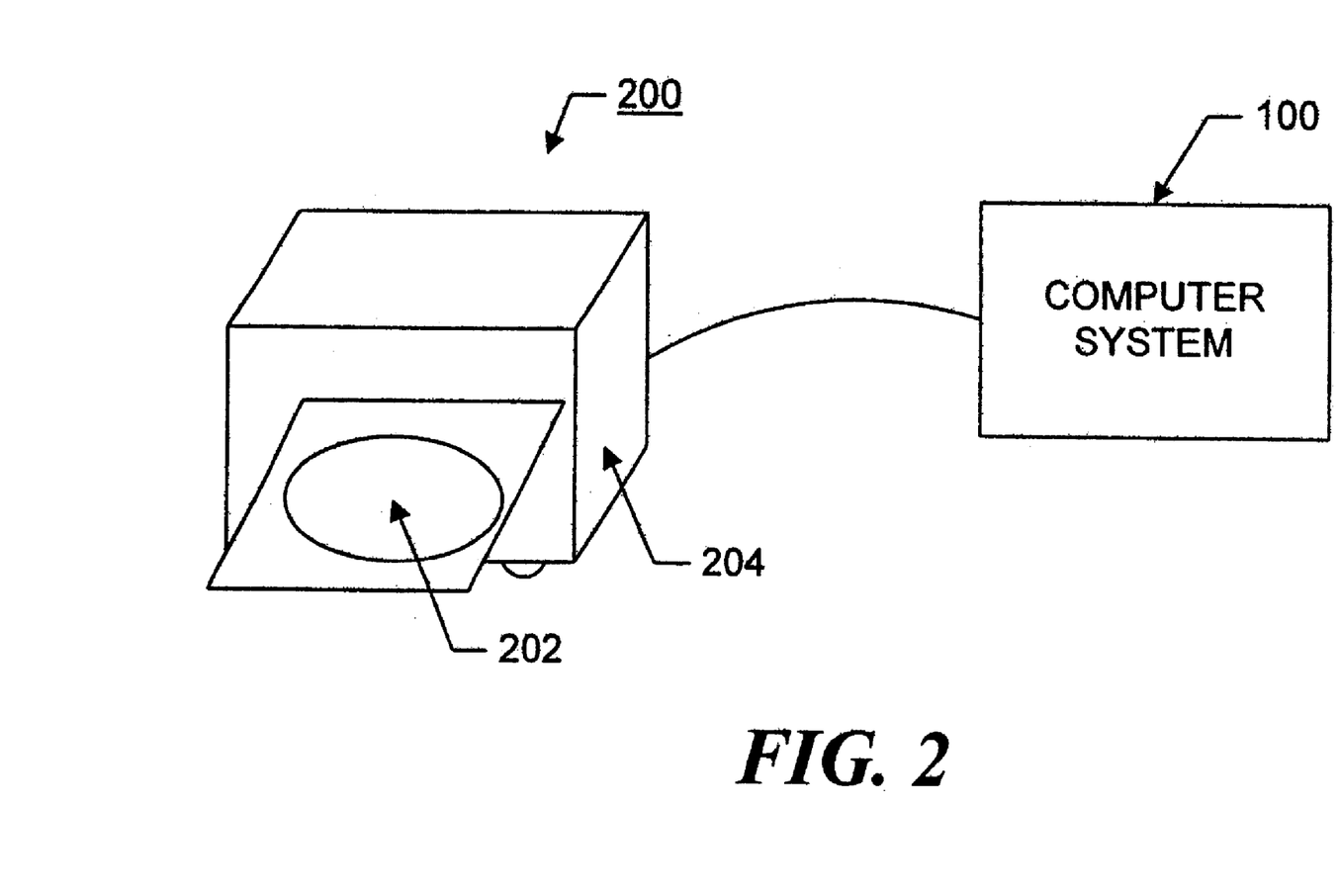
FIG. 2 is a schematic illustration of a digital versatile disc system that may be used to implement the invention.

FIG. 2 shows a DVD-ROM drive 200 connected to the computer 100. Use of the DVD-ROM drive 200 with the computer 100 should not be construed as a limitation of the invention, however, since other DVD systems, such as a DVD-VIDEO systems, may be used with many other types of multimedia devices, including television systems.

The DVD drive 200 includes a disc 202 containing compressed and encoded information, and a DVD reader 204 for first decompressing and decoding the information on the disc 202, and then directing such information to the computer 100. The disc 202, which is programmed in accordance with the DVD 1.0 Specification, preferably contains up to seventeen gigabytes of information. The computer 100 includes a driver (not shown) for enabling the operating system in the computer 100 to control and exchange information with the reader 204.

Figure 3:
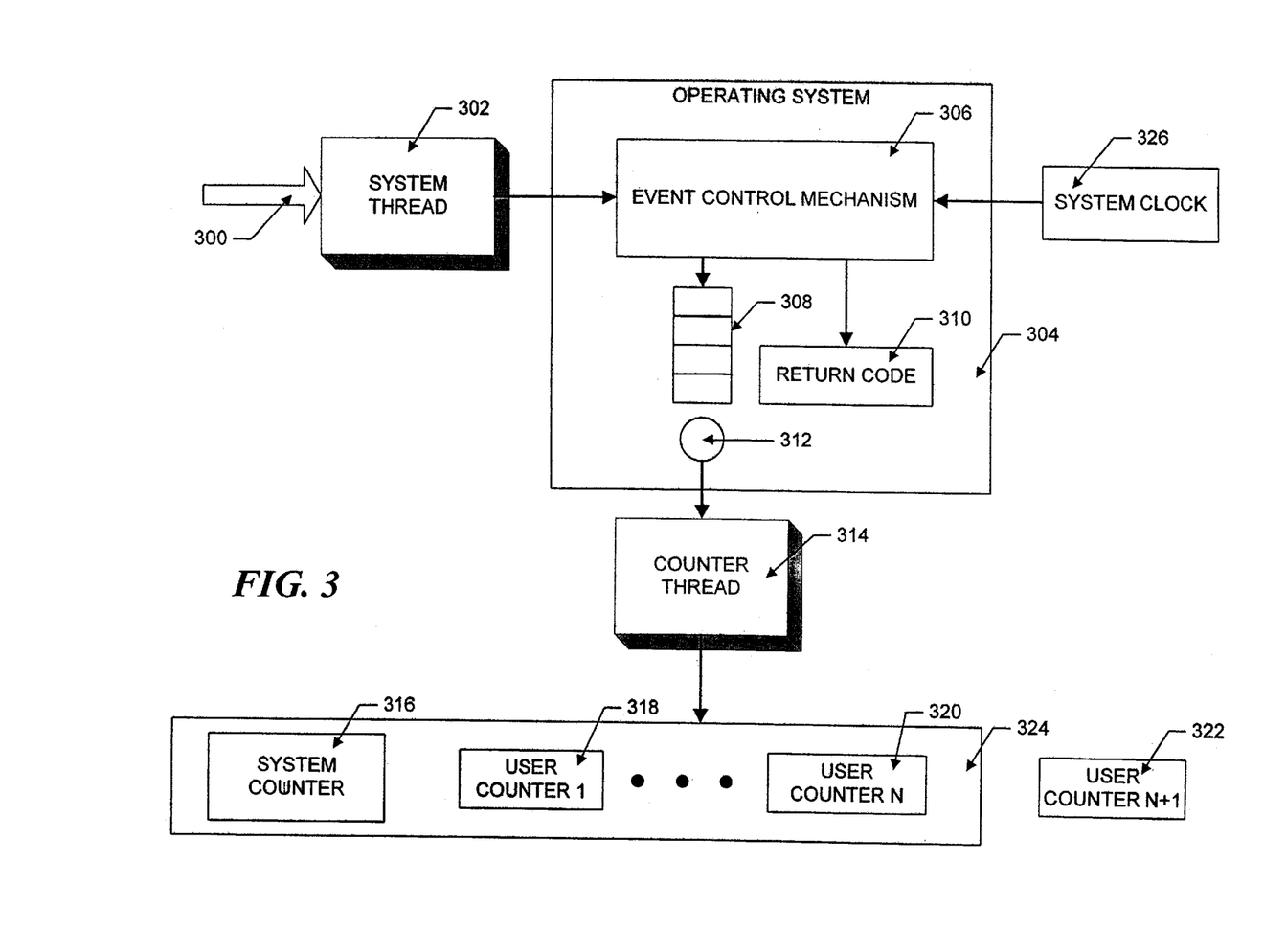
FIG. 3 is a block schematic diagram illustrating the relationship of the system thread, the counter thread and the semaphore.

The computer 100 includes a playback program shown schematically in FIG. 3 having a system thread 302 with logic for controlling many of the reader functions. Among those functions are decompressing and decoding the information on the disc 202. For example, the audio information may be compressed by means of conventional compression technique known as Dolby® AC-3® compression (also known as "Dolby® Digital" decompression), and video information may be compressed using a compression technique known as MPEG-2 (Moving Picture Experts Group-2).

The DVD player system also includes player parameters including a system counter parameter (system counter) 316 and sixteen user counter parameters (user counters) 318–322 that together may be used to control DVD system functions. As is known by those skilled in the art, each of the user counters 318–322 may be in one of two modes, namely "counter" mode or "register" mode. When in the register mode, the counters merely act as conventional registers to store 16-bit unsigned integers. When in counter mode, however, the value in the user counters 318–322 is incremented (and the value in the system counter 316 is decremented) at periodic time intervals. The user counters 318–322 merely maintain count values and include no logic for performing any additional functions. In contrast, the system counter 316 includes additional logic for performing functions based on its count value. Those functions are defined in detail in the aforementioned DVD specification.

In accordance with a preferred embodiment of the invention, the system thread 302 includes logic for creating a counter thread 314 in the memory 110 of computer 100 when the system thread 302 detects that at least one of the counter parameters 316–322 is in a counter mode. Once created, the counter thread 314 controls the operation of counters 316–322, thereby enabling the system thread 302 to perform other system functions. As demonstrated below, use of the counter thread 314 ensures efficient processor usage and accurate counter performance.

Figure 4:
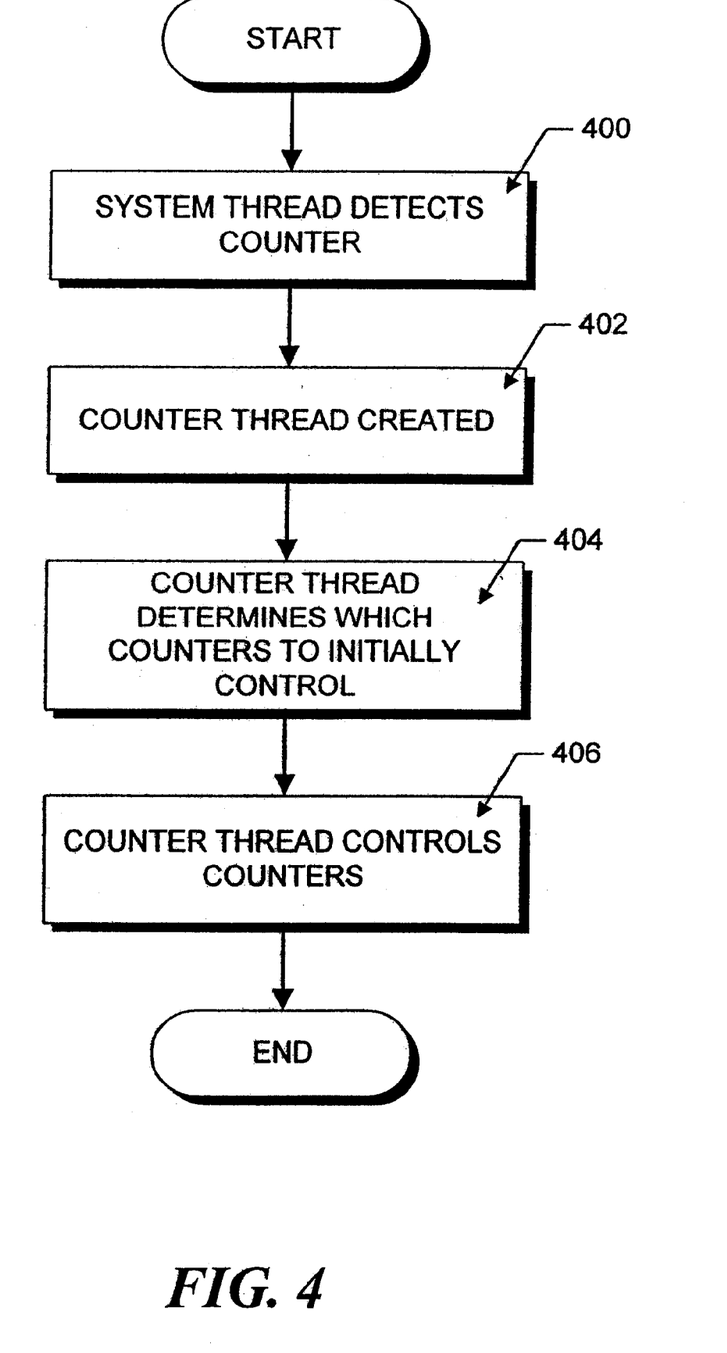
FIG. 4 is a flow chart generally showing the process used for processing counter parameters in accordance with a preferred embodiment of the invention.

FIG. 4 is a flow chart generally showing the process used for processing the counter parameters when they are in the counter mode. At step 400, the system thread 302 detects that at least one of the counter parameters 316–322 is to be utilized in the counter mode. In particular system thread 302 receives that data stream 300 read from the DVD. System thread 302 includes a decompression and decoding program which decodes the incoming data stream from disc 202, parses it and extracts embedded commands. The commands are then examined to detect a command which operates with at least one of the counters 316–322.

At step 402, the system thread 302 creates the counter thread in response to detecting that at least one of the system parameters is in its counter mode. Once created, the counter thread 314 can interact with both the system thread 302 and the operating system 304. In particular, by means of a semaphore mechanism described below, the system thread 302 can select the counters that the counter thread 314 increments and decrements. Counters controlled by the counter thread 314 may be considered to be in a group of associated counters (the "counter group 324") controlled by the counter thread 314.

In step 404, the system thread 302 adds counters to, or removes counters from, the counter group 324. In step 406, counter thread 314 increments, decrements, or resets counters in the counter group 324, as a group. By way of example, the functions performed by the counter thread 314 on the counters 316–324 may be in response to events in the system 200, such as disc calls, reader system requirements, and/or user interaction with the reader 204 via a graphical user interface. Counters not in the group 324, such as counter 322, are not affected by the operations performed by the counter thread 314.

Figure 5:
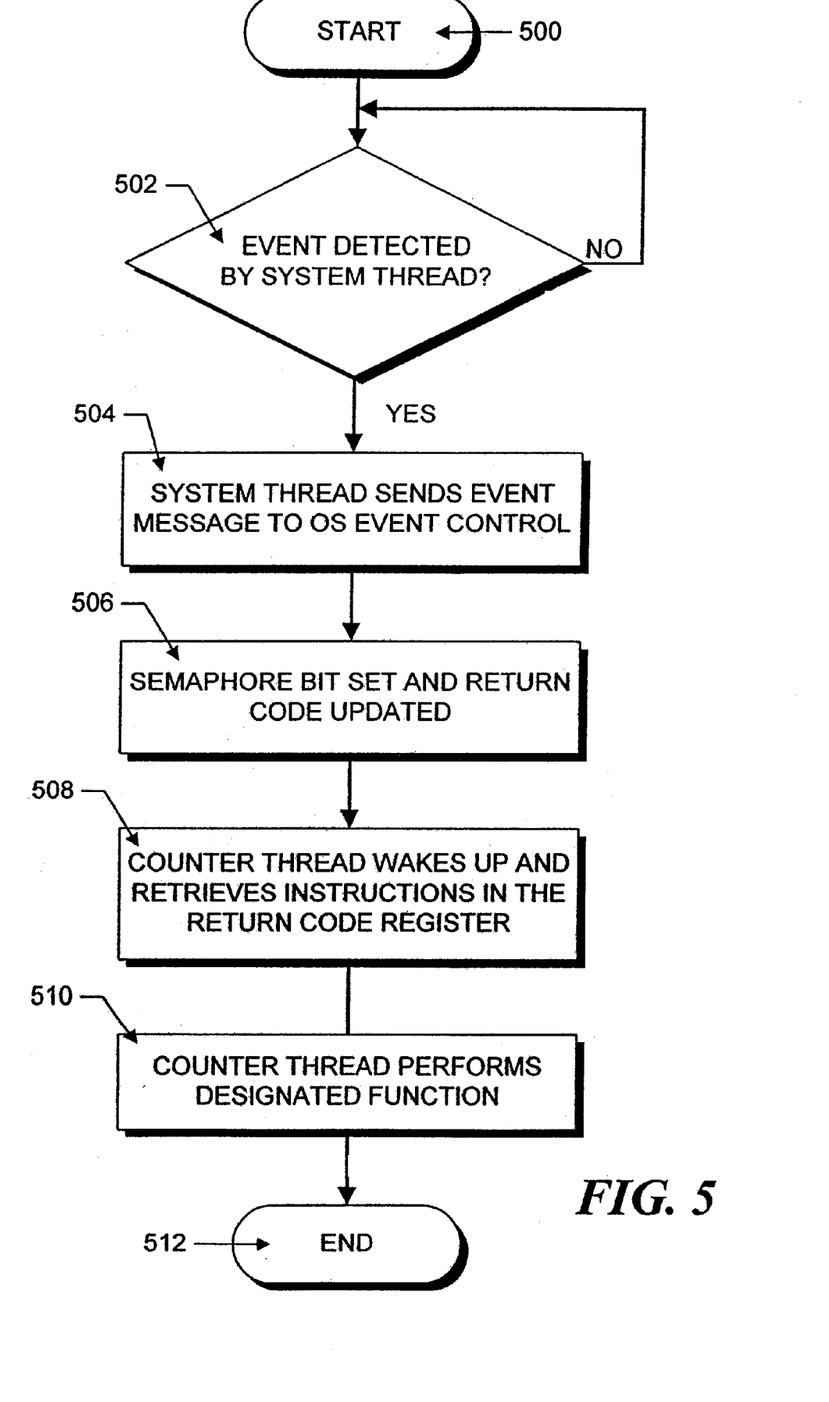
FIG. 5 is a flow chart generally showing the details of how the counter thread is controlled by the system thread via the semaphore.

The system thread 302 and the operating system 304 interact with the counter thread 314 by means of a semaphore mechanism which includes a semaphore 312, a queue 308 and a return code field 310. Semaphore events can be added to the queue 308 by means of an event control mechanism 306 which is part of the conventional operating system services. FIG. 5 is a flow chart generally describing the operation of the semaphore mechanism when the system thread 302 interacts with the counter thread 314. More particularly, the routine begins at step 500 and proceeds to step 502 where, the system thread 302 monitors events or generates a request to the counter thread to perform a specified function. If no events are detected or function requests generated, the routine returns to step 502. Alternatively, if an event is detected or a function requested, the routine proceeds to step 504 where the system thread 302 sends an event message to the operating system event control system 306. The event message may be sent, for example, by calling a send event message call which is part of the operating system API.

The counter thread 314 is configured to block itself until the semaphore "wakes it up." Accordingly, the counter thread 314 may be considered to be "sleeping" until it is unblocked by the semaphore. While sleeping, the counter thread 314 utilizes no processor time since it is not executing. More processor time therefore may be devoted to the system thread to carry out system processes.

In response to an event message, the event control mechanism 306 places a notification in the queue 308 and a return code in the return code register 310 indicating the type of event as indicated in step 506. The presence of a notification in the queue causes the semaphore to wake up the counter thread 314. The counter thread 314 then retrieves the return code from the register 310 (step 508) and performs the requested function (step 510). The routine then ends in step 512. For example, in response to an event message from the system thread 302, the counter thread 314 may reset all associated counters.

Figure 6:
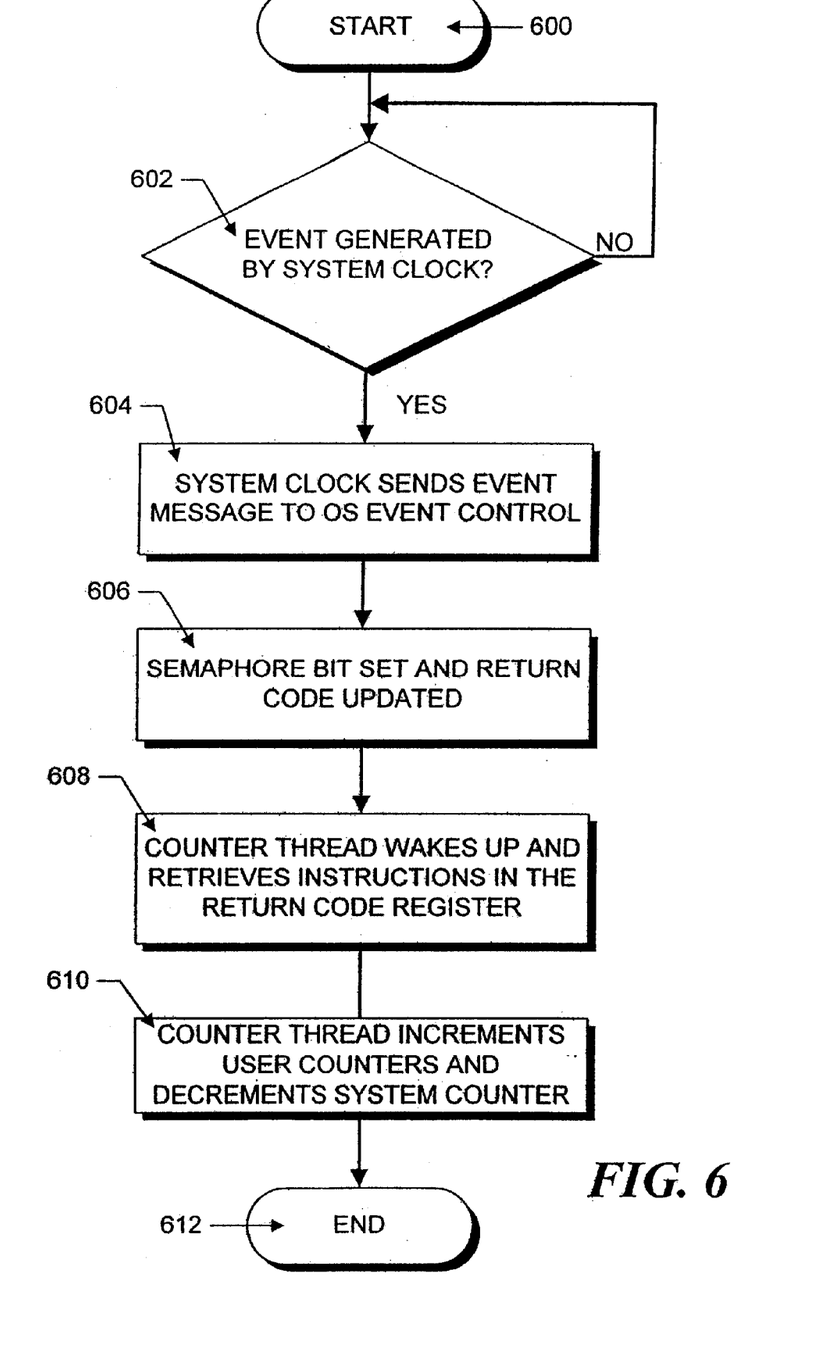
FIG. 6 is a flow chart generally showing the details of how the counter thread is controlled by the system clock to increment and decrement the counters.

The time interval may also be monitored in a similar manner by the routine illustrated in the flowchart in FIG. 6. More particularly, the routine begins at step 600 and proceeds to step 602 where, the system clock 326 generates an event after the elapse of a predetermined time interval, for example, one second. If a time event is generated, the routine proceeds to step 604 where the system clock 326 sends an event message to the operating system event control system 306. The event message may be sent, for example, by calling a send event message call which is part of the operating system API.

In response to an event message, the event control mechanism 306 places a notification in the queue 308 and a return code in the return code register 310 indicating the that the predetermined time interval has elapsed as indicated in step 606. The presence of a notification in the queue causes the semaphore to wake up the counter thread 314. The counter thread 314 then retrieves the return code from the register 310 (step 608) and decrements the system counter and increments the user counters (step 610). The routine then ends in step 612. Elapsed time messages and counter function request messages are therefore interleaved in the semaphore queue 308.

The apparatus and method for processing the counter parameters preferably is implemented entirely by an object-oriented programming (OOP) language such as C++. Accordingly, the invention includes classes that serve as templates for the objects representing messages, counters, and the counter thread. As understood by those skilled in the art and mentioned above, OOP techniques involve the definition, creation, use and destruction of "objects." Objects are software entities comprising data elements (i.e., "attributes") and methods (i.e., "functions" or "rules") that manipulate the data elements. Attributes and related methods are treated by the software as an entity and can be created, used and deleted as if they were a single item. The attributes and methods together enable objects to model virtually any real-world entity in terms of its characteristics (represented by the data elements) and its behavior (represented by its data manipulation functions). In this way, objects can model both concrete things (e.g., people or computers) and abstract concepts (e.g., numbers or geometrical designs).

Objects are defined by creating "classes", which are templates that instruct the compiler how to construct the actual object. By way of example, a class may specify the number and type of data variables, and the steps involved in the methods that manipulate such data variables. When an object-oriented program is compiled, the framework class code is incorporated into and compiled with the program. No objects exist at such time. Therefore, none of the variables or data structures in the compiled program exist or have any memory allotted to them. An object actually is created by the program at runtime by a specialized function called a "constructor" that uses the corresponding class definition and additional information, such as arguments provided during object creation, to construct the object. Conversely, objects are destroyed by a special function called a "destructor." Objects may be utilized by using their data and invoking their functions. When an object is created at runtime, memory is allotted and data structures are created, but the object has the data and functions defined by the class definitions.

When utilizing OOP techniques to implement the invention, the system thread and counter thread preferably are objects constructed from subclasses of a parent "thread" class. When the system thread detects use of a counter parameter, it sends a constructor message to a counter thread subclass to construct the counter thread. Once created, the counter thread object includes the methods that are utilized to process the counter parameters. Such methods have the capability of incrementing, decrementing, or resetting the counter parameters. In addition, the methods also may have the capability of adding or removing counter parameters from the group of counters controlled by the counter thread.

In an alternative embodiment, the invention may be implemented as a computer program product for use with a computer system. Such implementation may include a series of computer instructions fixed either on a tangible medium, such as a computer readable media (e.g., diskette 142, CD-ROM 147, ROM 115, or fixed disk 152 as shown in FIG. 1) or transmittable to a computer system, via a modem or other interface device, such as communications adapter 190 connected to the network 195 over a medium 191. Medium 191 may be either a tangible medium (e.g., optical or analog communications lines) or a medium implemented with wireless techniques (e.g., microwave, infrared or other transmission techniques). The series of computer instructions embodies all or part of the functionality previously described herein with respect to the invention. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network 195 (e.g., the Internet or World Wide Web).

Although various exemplary embodiments of the invention have been disclosed, it will be apparent to those skill in the art that various changes and modifications can be made which will achieve some of the advantages of the invention without departing from the true scope of the invention. For example, the inventive apparatus and method can be implemented totally in hardware circuits, in firmware or in software. Alternatively, the invention may be implemented in a combination of hardware, firmware and software. These and other obvious modifications are intended to be covered by the appended claims.

Having thus described the invention, what we desire to claim and secure by Letters Patent is:

1. A method of managing a plurality of counters in a digital versatile disc system having a multi-threaded operating system and a playback program with a system program thread, the method comprising:

A. creating a single independent counter program thread in the playback program when at least one of the plurality of counters is to be utilized by the system, the counter thread exclusively controlling counters that are placed under its control;

B. sending commands from the system program thread to the counter program thread specifying each of the plurality of counters, and causing the each counter to be placed under control of the counter program thread;

C. using the counter thread to periodically increment and decrement all counters under its control independently of the system program thread; and D. using the counter program thread at times when the counter program thread is not incrementing and decrementing counters under its control to execute another function on all of the counters under its control independently of the system program thread.

2. The method as defined by claim 1 wherein the digital versatile disc system is controlled by the system program thread and wherein step A is performed by the system program thread.

3. The method as defined by claim 1 wherein the digital versatile disc system is controlled by the system program thread and wherein step B comprises the step of:

B1. sending a remove command from the system program thread to the counter program thread specifying one of the plurality of counters to delete; and B2. the counter program thread removing the one counter from its control.

4. The method as defined by claim 1 wherein the digital versatile disc system is utilized with a computer system having a system clock, and wherein step A includes the step of:

A1. using the operating system to create a semaphore with a semaphore queue and wherein step C includes the steps of:

C1. monitoring the system clock to determine when a predetermined interval of time has elapsed; and C2. inserting a message into the semaphore queue when the elapse of a predetermined interval is determined in step C1.

5. A method of managing digital versatile disc system, having a system clock, a multi-threaded operating system having a semaphore with a semaphore queue and a playback program with a system program thread, the method comprising:

A. using the system thread in cooperation with the operating system to create a single independent counter program thread in the playback program when at least one of the plurality of counters is to be utilized by the system, the counter thread exclusively controlling counters that are placed under its control and becoming dormant when created;

B. sending commands from the system program thread to the counter program thread specifying each of the plurality of counters and causing the each counter to be placed under control of the counter program thread;

C. inserting a message into the semaphore queue at predetermined intervals of time as determined by the system clock, whereupon the semaphore detects a message in the semaphore queue and wakes up the counter program thread;

D. using the counter program thread, when awakened, to increment and decrement all counters under its control independently of the system program thread, the counter program thread then becoming dormant; and E. controlling the counter program thread at times when the counter program thread is not incrementing and decrementing counters under its control to another function on all of the counters under its control independently of the system program thread.

6. The method as defined by claim 5 wherein step E further comprises:

E1. inserting a message into the semaphore queue when another function is to be performed; and E2. waking up the counter program thread when a message is determined to be in the semaphore queue.

7. The method as defined by claim 5 wherein the operating system further includes a return code register and step C further comprises:

C1. causing the counter program thread to read the return code register to determine what action is to be taken when the counter program thread is woken up.

8. The method of claim 5 wherein the counter program thread is self-blocking.

9. Apparatus for managing a plurality of counters in a digital versatile disc system, having a system clock, a multi-threaded operating system having a semaphore with a semaphore queue and a playback program with a system program thread, the apparatus comprising:

a single independent counter program thread created in the playback program when at least one of the plurality of counters is to be utilized by the system, the counter thread exclusively controlling counters that are placed under its control and becoming dormant when created;

a mechanism for sending commands from the system program thread to the counter program thread specifying each of the plurality of counters and causing the each counter to be placed under control of the counter program thread;

a time event processor for inserting a message into the semaphore queue at predetermined intervals of time as determined by the system clock, whereupon the semaphore detects a message in the semaphore queue and wakes up the counter program thread the counter program thread thereupon incrementing and decrementing all counters under its control; and a function event processor which controls the counter program thread at times when the counter program thread is not incrementing and decrementing the counters under its control to execute a selected function on counters under its control.

10. The apparatus as defined by claim 9 wherein the digital versatile disc system is controlled by a system program thread and wherein the counter program thread is created by the system program thread.

11. The apparatus as defined by claim 9 wherein the digital versatile disc system is controlled by a system program thread and wherein the mechanism that causes counters to be placed under control of the counter program thread comprises:

an event control mechanism which sends an add command from the system program thread to the counter program thread specifying an additional one of the plurality of counters; and a mechanism in the counter program thread places the additional one of the plurality of counters under control of the counter program thread.

12. The apparatus as defined by claim 9 wherein the digital versatile disc system is controlled by a system program thread and the apparatus further comprises a reference removing mechanism that includes:

an event control mechanism which sends a remove command from the system program thread to the counter program thread specifying one of the plurality of counters to be deleted; and a mechanism in the counter program thread which removes counter to be deleted from the counters under its control.

13. The apparatus as defined by claim 9 wherein the function event processor further comprises:

a mechanism for inserting a message into the semaphore queue when a function is to be performed whereupon the semaphore wakes up the counter program thread when a message is detected in the semaphore queue.

14. The apparatus as defined by claim 9 wherein the operating system further includes a return code register and the time event processor causes the counter program thread to read the return code register to determine what action is to be taken when the counter program thread is woken up.

15. The apparatus of claim 9 wherein the counter program thread is self-blocking.

16. A computer program product for managing a plurality of counters in a digital versatile disc system, having a system clock, a multi-threaded operating system having a semaphore with a semaphore queue and a playback program with a system program thread, the computer program product comprising a computer usable medium having computer readable program code thereon comprising:

program code for using the system program thread in cooperation with the operating system to create a single independent counter program thread in the playback program when at least one of the plurality of counters is to be utilized by the system, the counter thread exclusively controlling counters that are placed under its control and becoming dormant when created;

program code for sending commands from the system program thread to the counter program thread specifying each of the plurality of counters and causing the each counter to be placed under control of the counter program thread;

program code for inserting a message into the semaphore queue at predetermined intervals of time as determined by the system clock, whereupon the semaphore detects a message in the semaphore queue and wakes up the counter program thread;

program code for using the counter program thread, when awakened, to increment and decrement all counters under its control independently of the system program thread, the counter program thread then becoming dormant; and program code for controlling the counter program thread at times when the counter program thread is not incrementing and decrementing counters under its control to execute another function on the counters under its control.

17. The computer program product as defined by claim 16 wherein the digital versatile disc system is controlled by a system program thread and wherein the program code for creating the counter program thread is executed by the system program thread.

18. The computer program product as defined by claim 16 wherein the digital versatile disc system is controlled by a system program thread and wherein the program code for causing the each counter to be placed under control of the counter program thread comprises:

program code for sending an add command from the system program thread to the counter program thread specifying an additional one of the plurality of counters; and program code for controlling the counter program thread to assume control of the additional one counter.

19. The computer program product as defined by claim 16 wherein the digital versatile disc system is controlled by a system program thread and wherein the computer program product further comprises program code for adding references including:

program code for sending a remove command from the system program thread to the counter program thread specifying one of the plurality of counters to be deleted; and program code for controlling the counter program thread to remove the one counter from the counters under its control.

20. The computer program product as defined by claim 16 wherein the counter program thread is self-blocking.

21. The computer program product as defined by claim 16 wherein the program code for executing a selected function comprises:

program code for inserting a message into the semaphore queue when a function is to be performed, the semaphore thereupon waking up the counter program thread when a message is determined to be in the semaphore queue.

22. The computer program product as defined by claim 16 wherein the operating system further includes a return code register and the program code for using the counter program thread comprises:

program code for causing the counter program thread to read the return code register to determine what action is to be taken when the counter program thread is woken up.

23. A computer data signal embodied in a carrier wave for managing a plurality of counters in a digital versatile disc system, having a system clock, a multi-threaded operating system having a semaphore with a semaphore queue and a playback program with a system program thread, the computer data signal comprising:

program code for using the system program thread in cooperation with the operating system to create a single independent counter program thread in the playback program when at least one of the plurality of counters is to be utilized by the system, the counter thread exclusively controlling counters that are placed under its control and becoming dormant when created;

program code for sending commands from the system program thread to the counter program thread specifying each of the plurality of counters and causing the each counter to be placed under control of the counter program thread;

program code for inserting a message into the semaphore queue at predetermined intervals of time as determined by the system clock, whereupon the semaphore detects a message in the semaphore queue and wakes up the counter program thread;

program code for using the counter program thread, when awakened, to increment and decrement all counters under its control independently of the system program thread, the counter program thread then becoming dormant; and program code for controlling the counter program thread at times when the counter program thread is not incrementing and decrementing counters under its control to execute another function on the counters under its control.

24. The computer data signal as defined by claim 23 wherein the created counter program thread is self-blocking.

* * * * *